(12) United States Patent
Fabre et al.

(10) Patent No.: US 11,865,796 B2
(45) Date of Patent: Jan. 9, 2024

(54) MOLD FOR MANUFACTURING A TURBINE ENGINE FAN CASING FROM A COMPOSITE MATERIAL

(71) Applicant: SAFRAN AIRCRAFT ENGINES, Paris (FR)

(72) Inventors: Hubert Jean Marie Fabre, Moissy-Cramayel (FR); Raoul Jaussaud, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/917,453

(22) PCT Filed: Mar. 24, 2021

(86) PCT No.: PCT/FR2021/050506
§ 371 (c)(1),
(2) Date: Oct. 6, 2022

(87) PCT Pub. No.: WO2021/205091
PCT Pub. Date: Oct. 14, 2021

(65) Prior Publication Data
US 2023/0122853 A1    Apr. 20, 2023

(30) Foreign Application Priority Data
Apr. 7, 2020   (FR) ...................................... 2003460

(51) Int. Cl.
*B29C 70/34*    (2006.01)
*B29C 33/00*    (2006.01)
(Continued)

(52) U.S. Cl.
CPC ........ *B29C 70/345* (2013.01); *B29C 33/0038* (2013.01); *B29C 33/20* (2013.01);
(Continued)

(58) Field of Classification Search
CPC .................................................. B29C 70/345
See application file for complete search history.

(56) References Cited

U.S. PATENT DOCUMENTS

| | | | | |
|---|---|---|---|---|
| 2013/0011586 A1* | 1/2013 | Landry | ................... | B29C 33/26 |
| | | | | 428/34.1 |
| 2016/0167316 A1* | 6/2016 | Pillon | ................... | B29C 70/446 |
| | | | | 428/34.1 |

FOREIGN PATENT DOCUMENTS

| FR | 3 059 044 A1 | 5/2018 |
|---|---|---|
| WO | WO 2017/089680 A1 | 6/2017 |
| WO | WO 2018/234687 A1 | 12/2018 |

OTHER PUBLICATIONS

International Search Report as issued in International Patent Application No. PCT/FR2021/050506, dated Sep. 23, 2021.
(Continued)

*Primary Examiner* — Galen H Hauth
(74) *Attorney, Agent, or Firm* — Pillsbury Winthrop Shaw Pittman LLP (57) ABSTRACT

A mold for manufacturing a turbomachine fan casing made of composite material, includes a main axis mandrel around which a fibrous preform of a fan casing is intended to be wound; a plurality of counter-mold angular sectors assembled on the outer contour of the mandrel which are intended to close the mold and to compact the fibrous preform wound on the mandrel; wherein a flat seal with a main elongation axis directed along the main axis is arranged between each angular sector, the flat seal being compressed between two adjacent angular sectors, a first angular sector including a sealing portion passing below a lower face of the flat seal while a second angular sector including a sealing portion passing above an upper face of the flat seal.

9 Claims, 5 Drawing Sheets

(51) Int. Cl.
  *B29C 33/20* (2006.01)
  *F01D 25/24* (2006.01)
  *B29L 31/00* (2006.01)
(52) U.S. Cl.
  CPC ...... *F01D 25/24* (2013.01); *B29L 2031/7504* (2013.01); *F05D 2240/14* (2013.01); *F05D 2300/603* (2013.01)

(56) References Cited

OTHER PUBLICATIONS

International Preliminary Report on Patentability and the Written Opinion of the International Searching Authority as issued in International Patent Application No. PCT/FR2021/050506, dated Oct. 6, 2022.

* cited by examiner

MOLD FOR MANUFACTURING A TURBINE ENGINE FAN CASING FROM A COMPOSITE MATERIAL

CROSS-REFERENCE TO RELATED APPLICATIONS

This application is the U.S. National Stage of PCT/FR2021/050506, filed Mar. 24, 2021, which in turn claims priority to French patent application number 2003460 filed Apr. 7, 2020. The content of these applications are incorporated herein by reference in their entireties.

TECHNICAL FIELD

The present invention relates to the general field of the manufacture of turbomachine fan casings, and more particularly casings for retaining gas turbine fans for aeronautical engines.

PRIOR ART

In an aeronautical turbomachine a fan casing fulfills several functions. The fan casing defines the air inlet stream of the turbomachine, supports an abradable material facing the tip of the blades of the fan, supports a possible sound wave absorption structure for acoustic treatment at the inlet of the turbomachine, and incorporates or supports a retention shield.

The retention shield forms a trap, retaining debris, such as ingested objects or fragments of damaged blades, projected under the influence of the centrifugal force, in order to avoid this debris passing through the casing and reaching other parts of the aircraft.

It is known to make the fan casing of composite material, and more particularly of organic matrix composite material. To this end, a fibrous texture is wound around a mandrel in order to form a fibrous preform which has the shape of the casing to be manufactured. The fibrous preform is then densified by a matrix.

In order to accomplish the densification of the fibrous preform by the matrix, said fibrous preform is wound around an impregnation mandrel, then counter-mold angular sectors are arranged around the impregnation mandrel in order to form the injection mold. A precursor material of the matrix is then injected into the mold in order to densify the fibrous preform with said precursor material of the matrix. Once the fibrous preform is densified, the precursor material is polymerized.

Known for example is document WO2017/089680, which describes an injection mold for manufacturing a fan casing made of composite material which comprises a plurality of angular sectors arranged around an impregnation mandrel.

In document WO2017/089680, the seal between the different angular sectors is provided by T-shaped parts which are attached by bolts between each angular sector and each of which compresses a flat seal overlapping two adjacent angular sectors.

A solution of this type has the disadvantage of requiring a very long handling time, particularly for screwing or unscrewing the bolts attaching the T-shaped parts to the angular sectors.

Moreover, an injection mold of this type can encounter a stiffness problem, and particularly stiffness at the connection between the angular sectors.

DISCLOSURE OF THE INVENTION

The present invention therefore has as its main object to mitigate a disadvantage of this type by proposing, according to a first aspect of the invention, a mold for manufacturing a turbomachine fan casing made of composite material, and more precisely of organic matrix composite material, comprising:

a main axis mandrel around which a fibrous preform of a fan casing is intended to be wound;

a plurality of counter-mold angular sectors assembled on the outer contour of the mandrel which are intended to close the mold and to compact the fibrous preform wound on the mandrel;

characterized in that a flat seal with a main elongation axis directed along the main axis is arranged between each angular sector, said flat seal being compressed between two adjacent angular sectors, a first angular sector comprising a sealing portion passing below a lower face of the flat seal while a second angular sector comprising a sealing portion passing above an upper face of the flat seal.

According to one possible feature, the flat seal is inclined around its main elongation axis so that the upper face of the flat seal is directed toward the second angular sector.

According to one possible feature, the upper surface of the flat seal is parallel to the sealing portion of the second angular sector.

According to one possible feature, the mandrel comprises an upstream flange and a downstream flange, a first annular seal being arranged around the upstream flange, and a second annular seal being arranged around the downstream flange, the lower face of the flat seal overlapping the first annular seal and the second annular seal.

According to one possible feature, protuberances protruding radially outward are angularly distributed over the upstream flange and the downstream flange, the protuberances of the upstream flange being axially aligned with the protuberances of the downstream flange, the protuberances comprising two flat faces and a peak at the junction between the two flat faces, the sealing portion of the first angular sector forming a flat surface on which the flat seal is arranged with a flat face of the protuberances of the upstream flange and a flat face of the protuberances of the downstream flange.

According to one possible feature, the protuberances are shaped like slots, or the protuberances are shaped like teeth.

According to one possible feature, the flat surface formed by the sealing portion of the first sector, the flat face of the protuberances of the upstream flange and the flat face of the protuberances of the downstream flange is perpendicular to the direction of attachment of the second angular sector to the mandrel.

According to one possible feature, the two flat faces of the protuberances have different slopes from one another.

According to one possible feature, the first angular sector is attached directly to the second angular sector.

According to one possible feature, the flat seal is made of an elastomer.

According to a second aspect, the invention relates to a method for manufacturing a turbomachine fan casing made of composite material with the mold according to any one of the preceding features, the method comprising the following steps:

winding a fibrous preform of the fan casing around the mandrel;

assembling the plurality of counter-mold angular sectors on the outer contour of the mandrel by arranging a first angular sector on the outer contour of the mandrel, the flat seal then being arranged on the sealing portion of the first angular sector, a second angular sector then being arranged on the mandrel by placing the sealing portion of the second angular sector over the flat seal;

densifying the fibrous preform by injecting a precursor material of a matrix of the composite material into the mold;

polymerizing the precursor material to obtain the matrix of the composite material;

removing the plurality of angular sectors;

de-molding the fan casing.

BRIEF DESCRIPTION OF THE DRAWINGS

Other features and advantages of the present invention will be revealed by the description given below, with reference to the appended drawings which illustrate one embodiment of it without any limiting character.

DESCRIPTION OF THE EMBODIMENTS

As illustrated in FIGS. 1 to 4, a mold 1 for manufacturing a turbomachine fan casing made of composite material comprises a mandrel 2 around which a fibrous preform of the fan casing is wound. The mandrel 2 has a cylindrical shape with main axis $\theta$.

Figure 1:
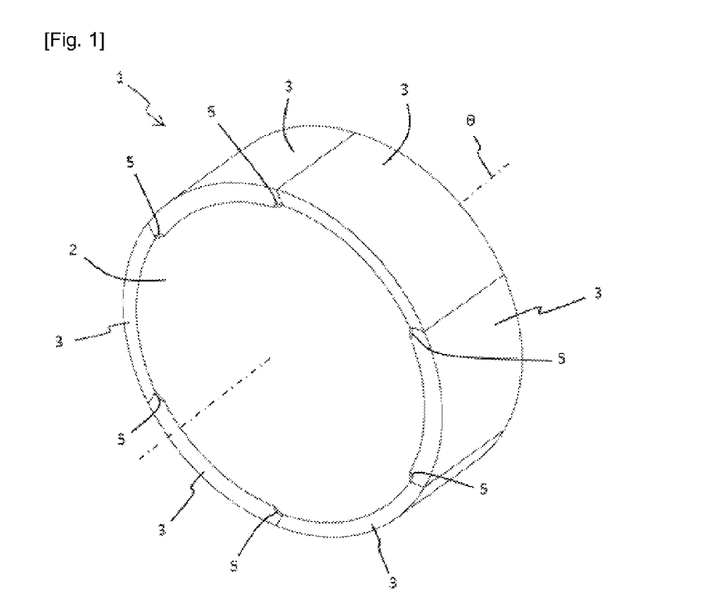
FIG. 1 shows schematically a mold for manufacturing a fan casing made of composite material according to a first embodiment.

The mold 1 is intended to be used for impregnation of the fibrous preform using a method of the RTM ("Resin Transfer Molding") type.

The fibrous preform can be made by two-dimensional weaving of fibers (2D weaving), or preferably by three-dimensional weaving of fibers (3D weaving).

By "three-dimensional weaving" or "3D weaving" or even "multi-layer weaving" it should be understood a weaving mode by which at least some of the weft yarns connect warp yarns over several warp layers, or conversely, in a weave corresponding to a weaving pattern, said weaving pattern being able to be selected among one of the following patterns: interlock, multi-web, multi-satin and multi-crimped.

By "two-dimensional weave" or "2D weave" it should be understood a conventional weaving mode by which each warp yarn passes from one side to the other of a single layer of warp yarns.

The fibrous preform can be created using carbon fibers, glass fibers, aramid fibers or even ceramic fibers.

Figure 2:
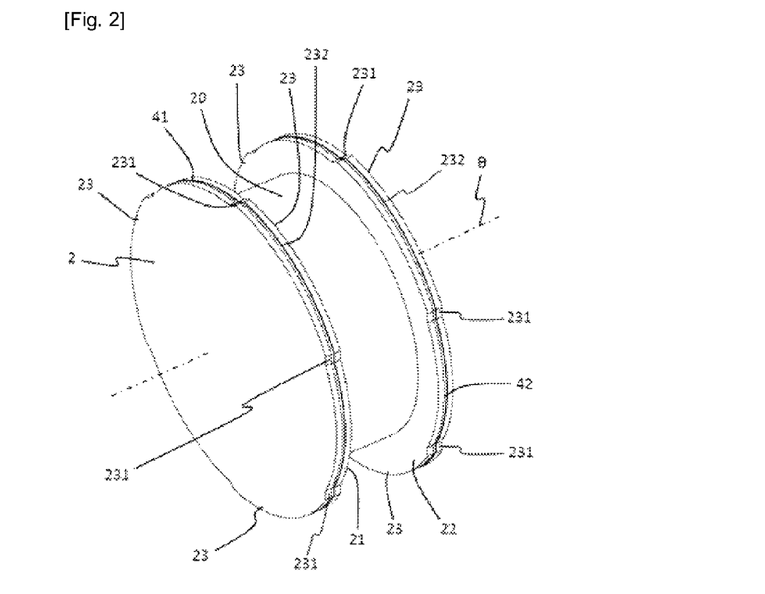
FIG. 2 shows schematically the mandrel of the mold of FIG. 1 without the angular sectors.

The outer walls 20 of the mandrel 2 around which the fibrous preform is rolled has a profile which corresponds to the profile of the fan casing to be manufactured.

The mold 1 also comprises a plurality of angular counter-mold sectors 3 which are assembled removably on the outer contour of the mandrel 2. Once assembled on the outer contour of the mandrel 2, the angular sectors 3 close the mold 1 and compress the fibrous preform.

The compression of the fibrous preform by the angular sectors 3 on the one hand allows forcing the fibrous preform to adopt the profile of the outer surface 20 of the mandrel 2, and on the other hand allows obtaining the desired fiber density and thickness in the fan casing.

In order to attach the angular sectors 3 to the mandrel 2, the mandrel 2 comprises an upstream flange 21 located at a front end of the mandrel 2, and a downstream flange 22 located at a rear end of the mandrel 2, and each angular sector 3 comprises on the one hand a front flange which is configured to cooperate with the upstream flange 21, and on the other hand a rear flange which is configured to cooperate with the downstream flange 22.

In the variant illustrated in FIGS. 1 to 4, the front flange and the rear flange of the angular sectors 3 are respectively attached to the upstream flange 21 and to the downstream flange 22 by bolted connections which are arranged in the bores formed in said front flange and rear flange of the angular sectors 3, and the upstream flange 21 and the downstream flange 22 of the mandrel 2.

Moreover, the angular sectors 3 are attached to each other, each angular sector 3 being directly attached to the two angular sectors 3 adjacent to it. The fact that the angular sectors 3 are attached to one another allows increasing the stiffness of the mold 1. In addition, the fact that the angular sectors are fixed directly to one another allows simplifying the mold 1 by dispensing with the T-shaped parts used in the prior art. To this end, each angular sector 3 can comprise a flange at each of its lateral ends, so that the adjacent angular sectors 3 are attached by their flanges at their lateral ends. The attachment of the flanges of the lateral ends of the adjacent angular sectors 3 can be accomplished by bolted connections.

As can be seen in FIG. 2, a first annular seal 41 is arranged around the upstream flange 21 of the mandrel 2, and a second annular seal 42 is arranged around the downstream flange 22 of the mandrel 2. The first annular seal 41 and the second annular seal 42 are each arranged in a recess formed in the upstream flange 21 and the downstream flange 22 of the mandrel 2. The first annular seal 41 and the second annular seal 42 are pressed by the front flanges 31 and the rear flanges 32 of the sectors 3, thus allowing improving the sealing of the mold 1.

In addition, in order to improve the sealing of the mold 1, a flat seal 5 is arranged between each angular sector 3. The mold 1 thus comprises a plurality of flat seals 5 each of which is located between two adjacent angular sectors 3.

The flat seals 5 are formed by strips of impermeable material, such as an elastomer for example.

Figure 3:
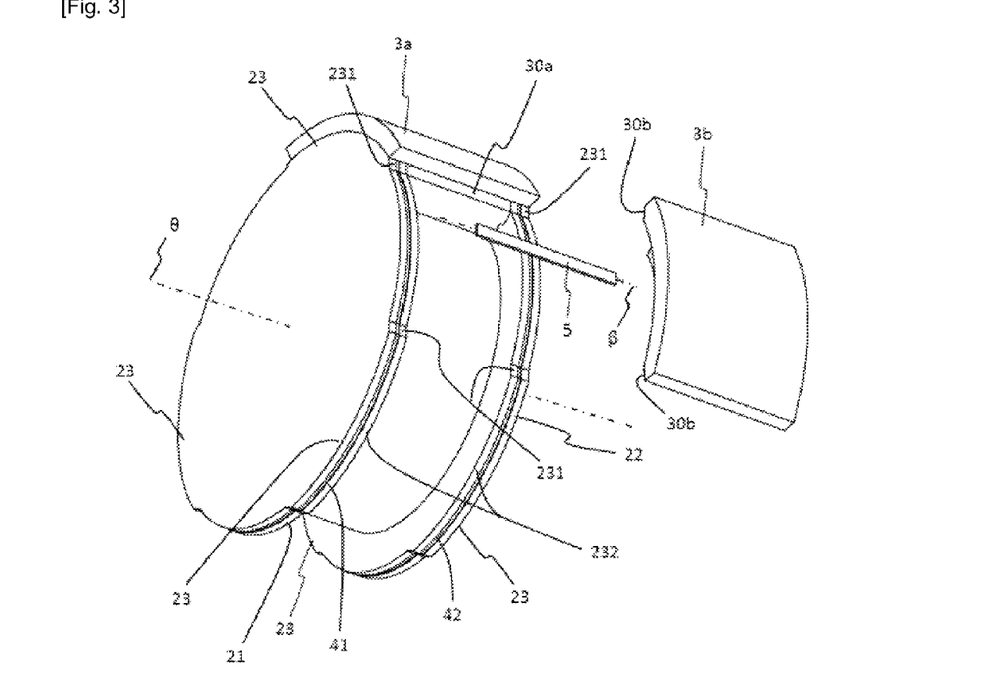
FIG. 3 shows schematically the positioning of a first angular sector on the mandrel of FIG. 2, as well as the cooperation of the first angular sector with a flat seal and a second angular sector.
Figure 4:
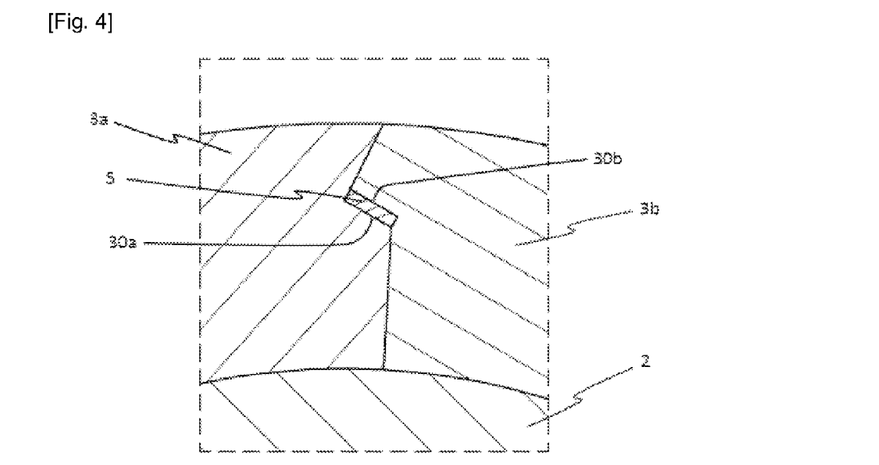
FIG. 4 shows schematically in section view the cooperation between the first angular sector, the second angular sector and the flat seal pressed between the two angular sectors.

The arrangement of the flat seals 5 is illustrated in FIG. 3. For the sake of simplification, a single flat seal 5 and only a first angular sector 3a and a second angular sector 3b are shown in FIG. 3, however the mold 1 comprises a plurality of first angular sectors 3a, a plurality of second angular sectors 3b, and a plurality of flat seals 5.

As can be seen in FIG. 3, the flat seal 5 is aligned with the main axis $\theta$ of the mandrel 2, in other words the flat seal 5 comprises a main elongation axis $\beta$ which is parallel to the main axis $\theta$.

The flat seal 5 is pressed, on the one hand, between a sealing portion 30a of the first angular sector 3a and, on the other hand, a sealing portion 30b of the second angular sector 3b. To this end, the sealing portion 30a of the first angular sector 3a forms a flat surface which passes below a lower face of the flat seal and on which the flat seal 5 is deposited, and the sealing portion 30b of the second angular sector 3b forms a flat surface which is complementary to the sealing portion 30a of the first angular sector 3a and which passes above an upper face of the flat seal so as to press the flat seal 5 against the sealing portion 30a of the first angular sector 3a. The shape of the sealing portion 30a of the first angular sector 3a and the shape of the sealing portion 30b of the second angular sector 3b are adapted to take into account the thickness of the flat seal 5, the two sealing portions 30a and 30b not being in contact with one another so as to leave sufficient room for the flat seal 5.

The flat seal 5 can be inclined around its main elongation axis β so that the upper face of the flat seal 5 is directed toward the second angular sector 30b, and the lower face of the flat seal 5 is directed toward the first angular sector 3a. In this variant, the sealing portion 30a and the sealing portion 30b each form an inclined flat surface. The upper face of the flat seal 5 is parallel to the sealing portion 30b of the second angular sector 3b.

In addition, the flat seal 5 overlaps the first annular seal 41 and overlaps the second annular seal 42, thus allowing providing a continuity of sealing at the connection between the first angular sector 3a and the second angular sector 3b.

As can be seen in particular in FIG. 3, the upstream flange 21 and the downstream flange 22 comprise a plurality of protuberances 23 which protrude outward. The protuberances are angularly distributed along the upstream flange 21 and the downstream flange 22, the protuberances 23 being aligned with the main axis θ. The protuberances 23 each comprise two flat faces 231 which are separated by a peak 232. The first annular seal 41 and the second annular seal 42 extend along the protuberances 23.

The flat seal 5 is placed so as to cover two flat faces 231, a first flat face 231 located on the upstream flange 21 and a second flat face 231 located on the downstream flange 22 which is axially aligned along 8 with the first flat face 231. The sealing zone 30a of the first sector 3a is located between the first flat face 231 and the second flat face 231 when the first sector 3a is mounted on the mandrel 2 in order to form a flat surface with said flat faces 231 on which the flat seal 5 is installed.

The first angular sector 3a has a sealing portion 30a at each of its two ends, which is configured to receive a flat seal 5, and the second angular sector 3b has a sealing portion 30b at each of its two ends which is configured to press a flat seal 5 against the sealing portion 30a of the first angular sector 3a.

A first angular sector 3a is surrounded by two second angular sectors 3b, and a second angular sector 3b is surrounded by two first angular sectors 3a.

Figure 7:
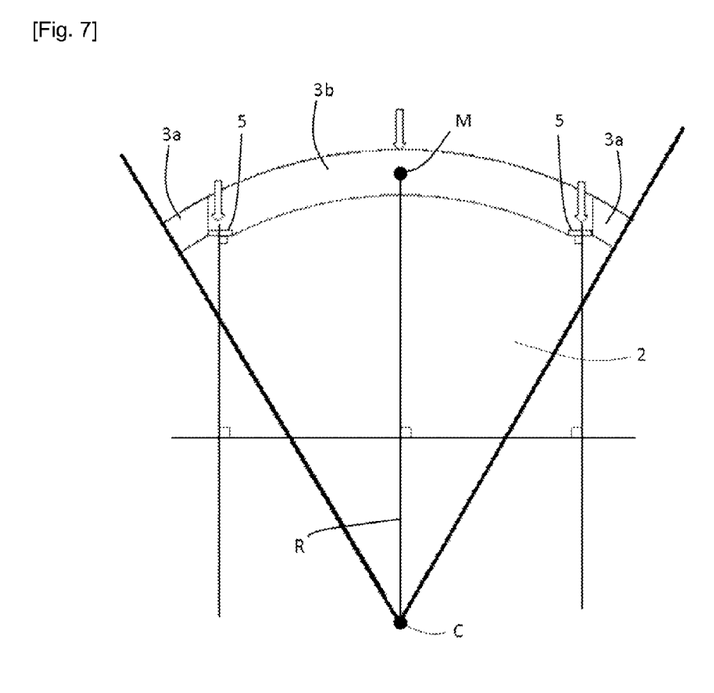
FIG. 7 shows schematically the direction of installation of a first angular sector on two adjacent second angular sectors.

Preferably, in order to limit the risk of shearing the flat seal 5, the flat surface which is formed by the sealing zone 30a of the first sector 3a, the first flat face 231 and the second flat face 231, is perpendicular to the direction of attachment of the second angular sector 3b on the mandrel 2. As illustrated in FIG. 7, the second sector 3b being installed vertically by means of a traveling crane, said second sector 3b is installed on the first adjacent sectors 3a with a direction of installation which follows the radius R formed between the center C of the mandrel 2 and a point M located in the middle of the second sector 3b. As can be seen in FIG. 7, the flat seal 5 is perpendicular to the radius R, which is therefore also the case for the flat surface which is formed by the sealing zone 30a of the first sectors 3a, the first flat face 231 and the second flat face 231.

Figure 5:
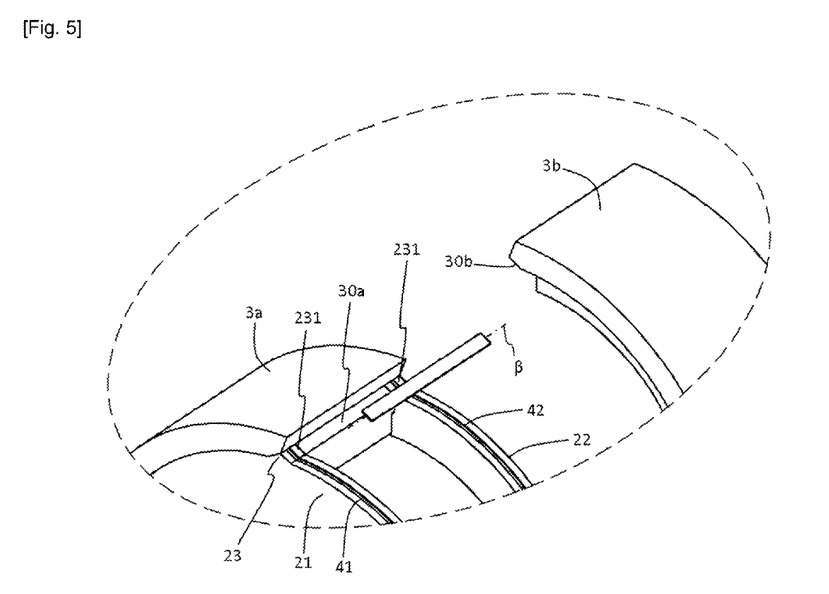
FIG. 5 shows schematically a mold according to a second embodiment.

In the first embodiment illustrated in FIGS. 1 to 3, the protuberances 23 have the shape of a slot. However, other forms can be possible, and for example the protuberances 23 can have the shape of a tooth as can be seen in FIG. 5, which illustrates a second embodiment. The slot-shaped protuberances 23 have a surface peak 232, while the tooth-shaped protuberances 23 have a linear peak 232.

In the first embodiment in which the protuberances 23 have the shape of a slot, the first angular sector 3a and the protuberances 23 have the same length, so that the first angular sectors 3 are located on protuberances 23 and the second angular sectors 3b are located between the protuberances 23.

In the second embodiment, in which the protuberances 23 are shaped like teeth, the sectors 3 are arranged between two protuberances 23.

According to a possible variant, the two flat faces 231 of the protuberances 23 have a different slope. In particular, the flat face 231 on which the flat seal 5 rests can have a greater slope than the other flat face 231. Thus the flat face 231 on which the flat seal 5 rests has a slope which is determined as a function of the direction of closure of the first angular sector 3a, and the other flat face 231 can have any slope.

Figure 6:
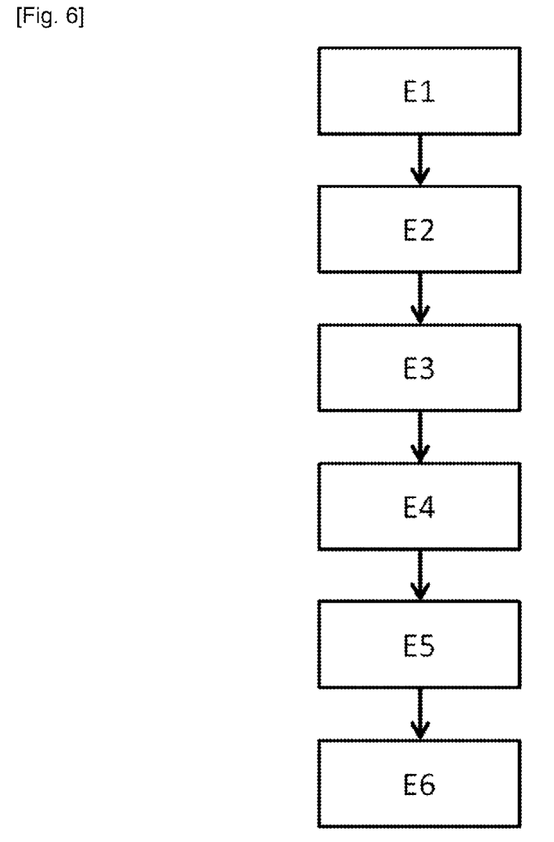
FIG. 6 shows schematically the different steps of a method for manufacturing a fan casing made of composite material.

As illustrated in FIG. 6, a method for manufacturing a fan casing made of composite material with the mold 1 comprises the following steps:
   E1: a fibrous preform of the fan casing is wound around the mandrel 2.
   E2: the mold 1 is closed by assembling the plurality of counter-mold angular sectors 3 on the outer contour of the mandrel 2. The assembly of the angular sectors 3 is carried out by arranging a first angular sector 3a on the mandrel 2, the arranging a flat seal 5 on the sealing portion 30a of the first angular sector 3a, then arranging the second angular sector 3b on the mandrel 2 placing the sealing portion 30b of the second angular sector 3b over the flat seal 5.
   E3: the fibrous preform is densified by injecting a precursor material of a matrix of the composite material into the mold 1.
   E4: the precursor material is polymerized in order to obtain the matrix of the composite material.
   E5: the angular sectors 3 are withdrawn in order to open the mold 1.
   E6: the fan casing is de-molded by being withdrawn from the mold 1.

According to a possible variant, step E2 is accomplished by first installing all the first angular sectors 3a on the mandrel 2, then arranging a flat seal on the sealing portions 30a of the first angular sectors 3a, then installing all the second angular sectors 3b by pressing the flat seals 5.

The invention claimed is:

1. A mold for manufacturing a turbomachine fan casing made of composite material, comprising:
   a mandrel with a main axis around which a fibrous preform of a fan casing is intended to be wound;
   a plurality of counter-mold angular sectors assembled on an outer contour of the mandrel which are intended to close the mold and to compact the fibrous preform wound on the mandrel;
wherein a flat seal with a main elongation axis directed along the main axis is arranged between each counter-mold angular sector, said flat seal being compressed between two adjacent counter-mold angular sectors, a first counter-mold angular sector comprising a sealing portion passing below a lower face of the flat seal while a second counter-mold angular sector comprising a sealing portion passing above an upper face of the flat seal, wherein the mandrel comprises an upstream flange and a downstream flange, a first annular seal being arranged around the upstream flange, and a second annular seal being arranged around the downstream flange, the lower face of the flat seal overlapping the first annular seal and the second annular seal.

2. The mold according to claim 1, wherein the flat seal is inclined around its main elongation axis so that the upper face of the flat seal is directed toward the second counter-mold angular sector.

3. The mold according to claim 1, wherein protuberances protruding radially outward are angularly distributed over the upstream flange and the downstream flange, the protuberances of the upstream flange being axially aligned with the protuberances of the downstream flange, the protuberances comprising two flat faces and a peak at the junction between the two flat faces, the sealing portion of the first angular sector forming a flat surface on which the flat seal is arranged with a flat face of the protuberances of the upstream flange and a flat face of the protuberances of the downstream flange.

4. The mold according to claim 3, wherein the protuberances are shaped like slots, or the protuberances are shaped like teeth.

5. The mold according to claim 3, wherein the flat surface formed by the sealing portion of the first sector, the flat face of the protuberances of the upstream flange and the flat face of the protuberances of the downstream flange is perpendicular to a direction of attachment of the second counter-mold angular sector to the mandrel.

6. The mold according to claim 4, wherein the first counter-mold angular sector is attached directly to the second counter-mold angular sector.

7. The mold according to claim 3, wherein the two flat faces of the protuberances have different slopes from one another.

8. The mold according to claim 1, wherein the flat seal is made of an elastomer.

9. A method for manufacturing a turbomachine fan casing made of composite material with the mold according to claim 1, the method comprising:

winding a fibrous preform of the fan casing around the mandrel;

assembling the plurality of counter-mold angular sectors on the outer contour of the mandrel by arranging a first counter-mold angular sector on the outer contour of the mandrel, the flat seal then being arranged on the sealing portion of the first counter-mold angular sector, a second counter-mold angular sector then being arranged on the mandrel by placing the sealing portion of the second counter-mold angular sector over the flat seal;

densifying the fibrous preform by injecting a precursor material of a matrix of the composite material into the mold;

polymerizing the precursor material to obtain the matrix of the composite material;

removing the plurality of counter-mold angular sectors;

de-molding the fan casing.

* * * * *